Figure 1:
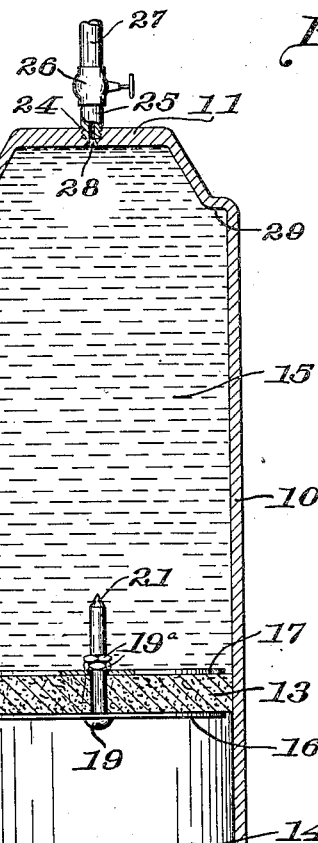

Nov. 7, 1933.　　　E. R. CANDOR　　　1,934,225

DISPENSING DEVICE

Filed Dec. 26, 1931

EDWARD R. CANDOR
INVENTOR

BY R. J. Dearborn
HIS ATTORNEY

Patented Nov. 7, 1933

1,934,225

UNITED STATES PATENT OFFICE 1,934,225

DISPENSING DEVICE

Edward R. Cander, Montclair, N. J., assignor to The Texas Company, New York, N. Y., a corporation of Delaware Application December 26, 1931
Serial No. 583,185

8 Claims. (Cl. 221—78)

My invention relates to dispensing apparatus and more particularly to a portable device for dispensing a material such as lubricating grease under a relatively high pressure.

The principal object of the invention is the provision of a device of this kind which will be capable of ejecting heavy greases under high pressures, which will be operable in any position and which may be readily shipped or moved from place to place.

In the lubrication of automobiles and especially in the lubrication of certain bearings of large busses and trucks where a heavy or relatively hard grease is necessary it is quite common to use a stationary pump which will force the lubricant through pipes or hose to the point of application. These stationary pumps are usually large and cumbersome and it is often difficult to locate such a pump within a reasonable distance from the point of application of the grease. Furthermore, these pumps must be filled from time to time by the operators and this consumes considerable time and often means that the pump is temporarily out of commission when it is needed. Moreover, the grease for use in the pump forms an additional fire hazard if it is stored around a garage or service station.

In accordance with my invention, I have provided a device which will dispense grease under pressures as high as obtainable with the stationary pumps but which will occupy but little room and which may readily be moved from place to place. A container is provided which may be filled with grease under pressure at some central distributing point and then conveniently transported to the point of use where a suitable hose may be attached and the grease injected into the bearings to be lubricated. The container, in effect, serves as a pump for automatically forcing the grease contained therein into the bearing to be lubricated. The device may be readily moved about a garage or service station and used at the place most convenient to the particular lubricating job, and when the container has been exhausted of grease it may readily be returned to the distributing station where it may be refilled and used again, and so on indefinitely.

In carrying out my invention I have provided a container in the form of the steel bottles or cylinders often used to transport oxygen or other gases under high pressures. This container is provided with a free piston dividing it into two compartments one of which is filled with a gas such as air or carbon dioxide under a relatively high pressure, while the other compartment serves to hold the lubricant to be dispensed. When a valve at the lubricant end of the container is opened the compressed gas will force the piston and the lubricant ahead of the piston out of the bottle to the point of use. Means are provided to automatically close the dispensing end of the bottle before all of the grease has been ejected, thus preventing the compressed gas from leaking past the piston and out of the container through the lubricant discharging outlet.

Figure 2:
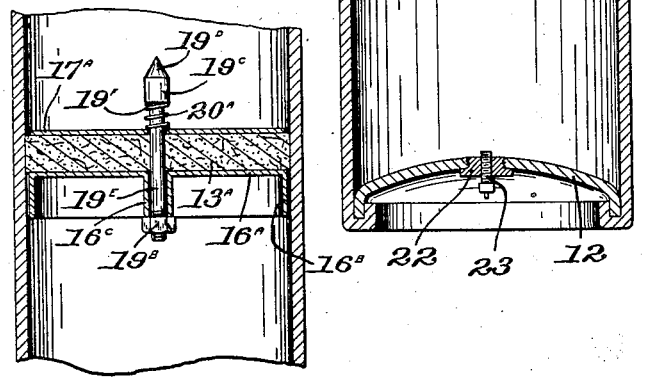

For a better understanding of my invention, reference may be had to the accompanying drawing which in Fig. 1 shows a longitudinal section through a dispensing device embodying my invention and in Fig. 2 a sectional view of a modification.

A container or cylinder 10 which may be of the general form and proportions as the steel bottles or cylinders used for storing and transporting oxygen or other gases has one of its ends 11 substantially closed and is provided at its other end with a closure member 12 which may be secured in the cylinder by any suitable means. While I have shown the closure 12 as being merely crimped in the end of the cylinder 10, it is of course to be understood that the closure may be secured in other ways such as by means of a threaded connection between the closure and the end of the cylinder.

A floating or free piston designated generally by the ordinal 13 is slidably mounted within the container 10 and serves to divide the container into two compartments, an air or gas compartment 14 and a lubricant or grease compartment 15. The piston 13 comprises a pair of metallic discs 16 and 17 between which is secured a packing 18 which may be of cork, compressed felt or other suitable material. A bolt 19 provided with a pair of lock nuts 19a serves to hold the discs 16, 17 and the packing 18 in place, the arrangement being such that the bolt does not prevent the discs 16 and 17 from moving toward each other, thus compressing the packing 18. The bolt 19 is provided with a tapered end 21 the purpose of which will be described hereinafter.

The closure member 12 is provided with a plug 22 in which is inserted a suitable check valve 23. The closed end 11 of the container is provided with an opening 24 in which is preferably threaded a small pipe nipple 25. A suitable valve 26 is secured to the nipple and to this valve may be connected a pipe or hose 27 for conveying the lubricant to the bearing to be lubricated. The opening 24 has a conical portion 28 in which the tapered end 21 of the bolt 19 is adapted to fit when the piston 13 has reached one of its extreme positions. The container 10 is provided with an inwardly projecting annular shoulder 29, which is also adapted to be engaged by the piston disc 17 when the piston is in the position just referred to.

When it is desired to fill or charge my dispensing device the valve 26 is opened and a source of air or gas under relatively high pressure is attached to the check valve 23. The piston 13 will then be forced by the compressed gas to its outer extreme position, that is, to the top of the container when viewing Fig. 1 of the drawing and the piston disc 17 will engage the shoulder 29 to prevent further movement of the piston. The increasing gas pressure in the container will tend to force the piston disc 16 toward the disc 17 compressing the spring 20 and squeezing the packing 18 outwardly so that it will more firmly engage the inner surface of the container to prevent leakage of the gas around the piston. As a further safeguard to prevent the escape of any gas which might leak around the piston 13 and out through the opening 24 or through the valve 26, the tapered end 21 of the bolt 19 will engage the conical portion 28 of the opening 24 and will serve as a valve to close this opening and prevent the leakage of the gas. The loose connection between the disc 16 and bolt 19 permits the disc to slide over the bolt thus preventing the total pressure on the disc 16 from forcing the bolt so tightly into the opening 28 as to prevent the ready filling of the container with grease. When the gas forced into the container has reached a predetermined pressure of say 2000 pounds per square inch the source of compressed gas supply is detached from the valve 23 and a source of lubricant or grease is attached to the hose 27 or directly to the valve 26. The grease is then pumped into the compartment 15 and the piston 13 will of course be moved toward the other end of the cylinder. When the cylinder has been about half filled with grease the gas in the compartment 14 will have been compressed into about half of its original volume and the pressure of the gas should then be approximately 4000 pounds per square inch. The valve 26 will then be tightly closed and the source of grease disconnected whereupon the device will be in condition for immediate use or for shipment to any desired point. The hose 27 will preferably be detached from the valve 26 when the device is being stored or shipped.

When it is desired to dispense grease from the container such as for the purpose of lubricating a bearing or bearings, the hose 27 may be connected to the valve 26 and to the bearing to be lubricated and the valve 26 opened. The compressed gas in the compartment 14 will then force the piston 13 and the grease ahead of the piston out through the valve 26 and hose 27 to the bearing. This operation will continue as long as the grease can flow through the tube 27 into the bearing and may be repeated until substantially all of the grease has been exhausted from the container. At this point the piston disc 17 will engage the shoulder 29 and the tapered portion of the bolt 19 will close the opening 24 to prevent the escape of any of the compressed gas around the piston and out through the opening 24 or past the valve 26.

The container 10 may then be shipped, for instance to a central distributing point and then recharged merely by pumping grease into the compartment 15 in the manner pointed out hereinbefore.

In Fig. 2 of the drawing I have illustrated a slightly modified form of piston. In this form the packing 13a and the disc 17a may be the same as the packing 13 and disc 17 shown in Fig. 1. The disc 16a, however, is provided with an outer depending flange 16b which will tend to prevent the piston from turning sidewise in the cylinder. The disc 16a is also provided with a central depending flange or sleeve 16c which forms a bearing for the bolt 19e. The bolt 19e is provided with a nut 19b at one end and an enlarged portion 19c at its other end, and is formed with a tapered portion 19d corresponding to the tapered end 21 of the bolt shown in Fig. 1. In this instance a compression spring 20a surrounds the bolt and bears against the disc 17a and a shoulder 19f formed on the bolt. The operation of this form of piston will be substantially the same as that shown in Fig. 1, the tapered end 19d engaging the conical valve seat 28 when the piston has reached its upper extreme position. In this position the spring 20 will hold the tapered end 19d in the valve seat 28, the piston sliding upwardly on the bolt.

It will be observed that I have provided a grease dispensing device by means of which grease may be pumped or injected into a bearing under high pressure and which will be extremely compact and readily portable so that it may be shipped or transported as easily as the well-known oxygen or gas bottle. In recharging or refilling the container the grease under a pressure of from 2000 to 6000 pounds will be sufficient to overcome the compression of the spring 20a and the pressure of the compressed gas acting against the lower end of the bolt 19e. The end 19d of the bolt will thus be forced away from the valve seat 28 and the grease then acting against the disc 17a will force the piston downwardly as described hereinbefore.

Obviously many modifications and variations of the invention, as hereinbefore set forth, may be made without departing from the spirit and scope thereof, and therefore only such limitations should be imposed as are indicated in the appended claims.

I claim:

1. In a grease dispensing device, a cylinder closed at one end, a closure for the other end of said cylinder, a gas inlet valve in said last mentioned closure, the closed end of said cylinder being provided with a grease outlet, and a free piston slidably mounted in said cylinder, said piston comprising a pair of discs, packing material between said discs and means for holding said discs and packing together, said means being adapted to engage and close said grease outlet when said piston is in one of its extreme positions.

2. In a grease dispensing device, a cylinder closed at one end, a closure for the other end of said cylinder, an inlet valve in said last mentioned closure for admitting compressed gas to said cylinder, the closed end of said cylinder being provided with a grease outlet, a free piston slidably mounted in said cylinder, said piston comprising a pair of discs, compressible packing material between said discs and a threaded bolt and nut for holding said discs and packing together, and a shoulder formed in said cylinder near one end thereof and adapted when substantially all of the grease has been discharged from said cylinder, to be engaged by one of said piston discs whereby the pressure exerted on the other of said discs by said compressed gas will cause said packing to tightly engage the walls of said cylinder and prevent the escape of gas therefrom, one end of said bolt being adapted to contact with and close said grease outlet when said piston disc and said shoulder are in engagement.

3. In a dispensing device, a cylinder closed at one end, a closure for the other end of said cylinder, a piston slidably mounted within said cylinder and adapted to divide said cylinder into two compartments, means for admitting compressed gas to one of said compartments, a connection through which the substance to be dispensed may be admitted to and discharged from the other of said compartments, and valve means secured to said piston and adapted to close said connection when said piston is in one of its extreme positions, said valve means including a member slidably mounted in said piston and resilient means tending to hold said member in said connection.

EDWARD R. CANDOR.